(12) United States Patent
Chelamchirayil Muraleedharan et al.

(10) Patent No.: US 12,418,945 B2
(45) Date of Patent: Sep. 16, 2025

(54) SYSTEM AND METHOD FOR VEHICLE BLUETOOTH PAIRING

(71) Applicant: GM GLOBAL TECHNOLOGY OPERATIONS LLC, Detroit, MI (US)

(72) Inventors: Anurag Chelamchirayil Muraleedharan, Stouffville (CA); Jarvis Chau, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 357 days.

(21) Appl. No.: 17/989,104

(22) Filed: Nov. 17, 2022

(65) Prior Publication Data

US 2024/0172301 A1    May 23, 2024

(51) Int. Cl.
*H04W 4/48* (2018.01)
*H04W 12/069* (2021.01)
*H04W 12/50* (2021.01)
*H04W 12/63* (2021.01)
*H04W 76/14* (2018.01)
*H04M 1/72409* (2021.01)

(52) U.S. Cl.
CPC ......... *H04W 76/14* (2018.02); *H04W 12/069* (2021.01); *H04W 12/50* (2021.01); *H04W 12/63* (2021.01); *H04M 1/724098* (2022.02)

(58) Field of Classification Search
CPC ............. H04W 52/0229; H04W 76/14; H04W 12/069; H04W 12/50; H04W 12/63; H04W 12/06; H04W 4/80; H04W 4/48; H04W 76/10; H04W 76/11; B60R 25/245; B60R 2325/101; B60R 25/24; H04M 1/724098; H04M 1/72412
See application file for complete search history.

(56) References Cited

U.S. PATENT DOCUMENTS

| | | | | |
|---|---|---|---|---|
| 8,499,154 | B2 * | 7/2013 | Huntzicker | H04W 12/069 713/168 |
| 10,200,849 | B1 * | 2/2019 | Heide | H04W 4/80 |
| 10,491,734 | B1 * | 11/2019 | Annasagaram Krishnamurthy | H04W 12/50 |
| 2011/0063098 | A1 * | 3/2011 | Fischer | G07C 9/29 455/26.1 |
| 2012/0254960 | A1 * | 10/2012 | Lortz | H04L 63/104 726/3 |
| 2013/0185152 | A1 * | 7/2013 | Aaron | G06Q 20/322 709/219 |
| 2017/0262622 | A1 * | 9/2017 | Abrams | G06F 21/35 |
| 2017/0302997 | A1 * | 10/2017 | Brown | H04N 21/44218 |

(Continued)

*Primary Examiner* — Cindy Trandai
(74) *Attorney, Agent, or Firm* — Quinn IP Law (57) ABSTRACT

A system for vehicle Bluetooth pairing is provided. The system includes a smartphone configured for Bluetooth communication. The system further includes a vehicle including a computerized pairing operation controller configured for Bluetooth communication. The computerized pairing operation controller includes programming to emit a notification signal detectable by the smartphone. The smartphone includes programming to establish proximity to the vehicle based upon the notification signal and establish a Bluetooth low energy connection to the vehicle based upon establishing the proximity. The computerizing pairing operation controller further includes programming to automatically set up a Bluetooth connection after the Bluetooth low energy connection is established.

19 Claims, 8 Drawing Sheets

(56) References Cited

U.S. PATENT DOCUMENTS

| | | | | |
|---|---|---|---|---|
| 2017/0311158 | A1* | 10/2017 | Clement | H04L 9/3228 |
| 2018/0099643 | A1* | 4/2018 | Golsch | G01S 13/765 |
| 2018/0326947 | A1* | 11/2018 | Oesterling | B60R 25/241 |
| 2018/0339676 | A1* | 11/2018 | Lazarini | H04W 4/40 |
| 2019/0087807 | A1* | 3/2019 | Choi | H04L 9/3226 |
| 2019/0130389 | A1* | 5/2019 | Fieglein | G07F 19/202 |
| 2019/0143936 | A1* | 5/2019 | Abel Rayan | H04W 12/68 |
| | | | | 701/2 |
| 2019/0166635 | A1* | 5/2019 | McColgan | H04W 12/50 |
| 2020/0106877 | A1* | 4/2020 | Ledvina | H04L 69/18 |
| 2020/0193408 | A1* | 6/2020 | Hadley | G06Q 20/385 |
| 2020/0298799 | A1* | 9/2020 | Golsch | B60R 25/24 |
| 2020/0311700 | A1* | 10/2020 | Hwang | G06Q 20/322 |
| 2021/0061225 | A1* | 3/2021 | Ahmed | H04W 4/023 |
| 2021/0099834 | A1* | 4/2021 | Mountford | H04W 4/023 |
| 2021/0293075 | A1* | 9/2021 | Oesterling | H04W 4/40 |
| 2021/0297270 | A1* | 9/2021 | Bauer | H04W 12/03 |
| 2023/0041669 | A1* | 2/2023 | Zhang | H04W 4/40 |
| 2023/0142055 | A1* | 5/2023 | Bankston | G06F 3/04842 |
| | | | | 726/6 |
| 2023/0217233 | A1* | 7/2023 | Zeng | H04W 8/005 |
| | | | | 455/41.2 |

* cited by examiner

SYSTEM AND METHOD FOR VEHICLE BLUETOOTH PAIRING

INTRODUCTION

The disclosure generally relates to a system and method for vehicle Bluetooth pairing.

Wireless communication enables a first electronic device to communicate with a second electronic device. One form of wireless communication is Bluetooth communication, a short-range communication format. In one exemplary embodiment, Bluetooth communication may enable a smartphone to communication with a telematics module of a vehicle. Bluetooth communications may be described as a communication or wireless protocol for exchanging data over short distances, for example, up to ten meters, from fixed and mobile devices and may be useful for creating personal area networks. Bluetooth communications may use short-wavelength ultra-high frequency radio waves of a frequency range between 2.4 and 2.485 Gigahertz (GHz).

Establishing communications between a first electronic device and a second electronic device may be described as pairing the devices.

SUMMARY

A system for vehicle Bluetooth pairing is provided. The system includes a smartphone configured for Bluetooth communication. The system further includes a vehicle including a computerized pairing operation controller configured for Bluetooth communication. The computerized pairing operation controller includes programming to emit a notification signal detectable by the smartphone. The smartphone includes programming to establish proximity to the vehicle based upon the notification signal and establish a Bluetooth low energy connection to the vehicle based upon establishing the proximity. The computerizing pairing operation controller further includes programming to automatically set up a Bluetooth connection after the Bluetooth low energy connection is established.

In some embodiments, the smartphone further includes programming to utilize an authentication certificate to provide an identity to the vehicle. The computerized pairing operation controller further includes programming to utilize a verification certificate to verify the identity of the smartphone. The programming to automatically set up the Bluetooth connection is performed after the identity is verified.

In some embodiments, the notification signal includes data configured as an identifier specific to the vehicle, and the programming to establish proximity to the vehicle based upon the notification signal establishes proximity to the vehicle based upon the data configured as the identifier specific to the vehicle.

In some embodiments, the data configured as an identifier specific to the vehicle is based upon a vehicle identification number for the vehicle.

In some embodiments, the programming to automatically set up the Bluetooth connection includes the smartphone and the vehicle verifying identities of each other based upon a first certificate saved in the smartphone and a second certificate saved in the vehicle. The programming to automatically set up the Bluetooth connection further includes the smartphone requesting a Bluetooth name from the vehicle and the vehicle providing the Bluetooth name to the smartphone. The programming to automatically set up the Bluetooth connection further includes the smartphone requesting a pairing code from the vehicle and the vehicle providing the pairing code to the smartphone.

In some embodiments, the programming to automatically set up the Bluetooth connection further includes the pairing code being displayed upon a display of the vehicle, the pairing code being displayed upon the smartphone, and completing the Bluetooth connection based upon a user providing confirmation of matching pairing codes.

In some embodiments, the programming to establish the Bluetooth low energy connection to the vehicle includes deriving a Bluetooth low energy service identifier based upon a vehicle identification number for the vehicle.

In some embodiments, the programming to automatically set up the Bluetooth connection includes monitoring a single touch input by a user to the smartphone and completing the Bluetooth connection based upon the single touch input.

According to one alternative embodiment, a system for vehicle Bluetooth pairing is provided. The system includes a smartphone configured for Bluetooth communication. The system further includes a vehicle including a computerized pairing operation controller configured for Bluetooth communication. The computerized pairing operation controller includes a vehicle onboarding application including programming to emit a notification signal detectable by the smartphone. The smartphone includes a smartphone onboarding application including programming to establish proximity to the vehicle based upon the notification signal and establish a Bluetooth low energy connection to the vehicle based upon establishing the proximity. The vehicle onboarding application further includes programming to automatically set up a Bluetooth connection after the Bluetooth low energy connection is established.

In some embodiments, the programming to automatically set up the Bluetooth connection includes the smartphone and the vehicle verifying identities of each other based upon a first certificate saved in the smartphone and a second certificate saved in the vehicle. The programming to automatically set up the Bluetooth connection further includes the smartphone requesting a Bluetooth name from the vehicle and the vehicle providing the Bluetooth name to the smartphone. The programming to automatically set up the Bluetooth connection further includes the smartphone requesting a pairing code from the vehicle and the vehicle providing the pairing code to the smartphone.

In some embodiments, the vehicle onboarding application and the smartphone onboarding application are configured for completing the Bluetooth connection based upon a single touch input by a user to the smartphone.

According to one alternative embodiment, a method for vehicle Bluetooth pairing is provided. The method includes, within a first computerized processor of a vehicle, activating Bluetooth signal including a notification signal visible to Bluetooth enabled devices. The method further includes, within a second computerized processor of a smartphone, receiving the notification signal, establishing proximity to the vehicle based upon the notification signal, and establishing a Bluetooth low energy connection to the vehicle based upon establishing the proximity. The method further includes, within the first computerized processor, automatically setting up a Bluetooth connection after the Bluetooth low energy connection is established.

In some embodiments, the method further includes, within the second computerized processor, utilizing an authentication certificate to provide an identity to the vehicle. The method further includes, within the first computerized processor, utilizing a verification certificate to verify the identity of the smartphone. Automatically setting up the Bluetooth connection is performed after the identity is verified.

In some embodiments, the notification signal includes data configured as an identifier specific to the vehicle. Establishing proximity to the vehicle based upon the notification signal includes establishing the proximity to the vehicle based upon the data configured as the identifier specific to the vehicle.

In some embodiments, the data configured as an identifier specific to the vehicle is based upon a vehicle identification number for the vehicle.

In some embodiments, automatically setting up the Bluetooth connection includes verifying identities of the smartphone and the vehicle based upon a first certificate saved in the smartphone and a second certificate saved in the vehicle. Automatically setting up the Bluetooth connection further includes the smartphone requesting a Bluetooth name from the vehicle and the vehicle providing the Bluetooth name to the smartphone. Automatically setting up the Bluetooth connection further includes the smartphone requesting a pairing code from the vehicle and the vehicle providing the pairing code to the smartphone.

In some embodiments, automatically setting up the Bluetooth connection further includes the pairing code being displayed upon a display of the vehicle, the pairing code being displayed upon the smartphone, the smartphone prompting a user to provide confirmation of matching pairing codes, and completing the Bluetooth connection based upon the confirmation.

In some embodiments, establishing the Bluetooth low energy connection to the vehicle includes deriving a Bluetooth low energy service identifier based upon a vehicle identification number for the vehicle.

In some embodiments, automatically setting up the Bluetooth connection includes monitoring a single touch input by a user to the smartphone and completing the Bluetooth connection based upon the single touch input.

The above features and advantages and other features and advantages of the present disclosure are readily apparent from the following detailed description of the best modes for carrying out the disclosure when taken in connection with the accompanying drawings.

DETAILED DESCRIPTION

Pairing a first electronic device to a second electronic device in a Bluetooth pairing operation includes establishing identities of the first device and the second device and then establishing a secure Bluetooth connection between the two devices. When a user's smartphone is paired with the electronics of a vehicle, the user may be prompted to provide information or otherwise provide inputs to one of the smartphone and/or a vehicle input device to complete the Bluetooth pairing operation. Difficult or involved pairing operations may be a dissatisfying factor for users.

A system and method are provided for vehicle Bluetooth pairing. An onboarding application is setup within the electronics of a vehicle. A complimentary onboarding application is setup within a user's smartphone. Proximity of the vehicle to the user's smartphone is established. Based upon the established proximity, an automated Bluetooth pairing operation is executed.

Establishing proximity of the vehicle to the user's smartphone may be performed in various ways. In one example, the smartphone may identify the vehicle based upon an identifier specific to the vehicle in the broadcast Bluetooth signal. The identifier specific to the vehicle may include or be derived from a vehicle identification number (VIN) for the vehicle. When the onboarding application in the smartphone identifies the Bluetooth signal with the given identifier, the smartphone may determine that the vehicle is in range to pair the Bluetooth. In another example, one of the electronics of the vehicle and the smartphone may broadcast a Bluetooth signal that other Bluetooth enabled devices may detect, and proximity of the vehicle to the smartphone may be established by evaluating a strength of that broadcast Bluetooth signal. For example, the strength of the broadcast Bluetooth signal may be compared to a preselected threshold signal strength, and proximity may be said to be established when the strength of the broadcast Bluetooth signal exceeds the threshold signal strength. The broadcast Bluetooth signal may be described as a notification signal or as a beacon. In another example, a location of the smartphone may be determined, a location of the vehicle may be determined, and a distance between the vehicle and the user's smartphone may be calculated. The distance may be compared to a preselected threshold distance, and when the distance is less than the threshold distance, the proximity of the vehicle to the smartphone may be said to be established.

Figure 1:
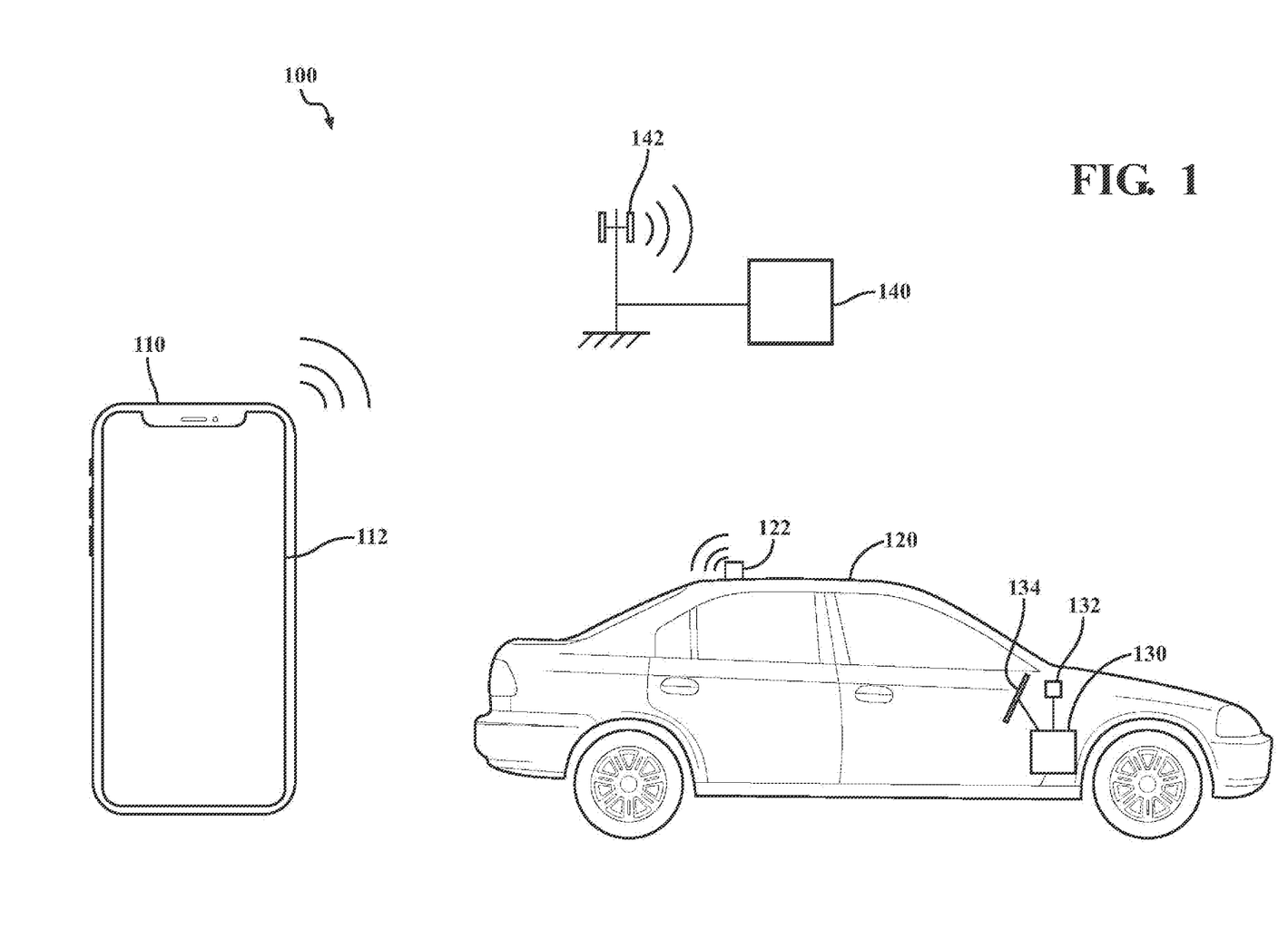
FIG. 1 illustrates a system for vehicle Bluetooth pairing, in accordance with the present disclosure.

Referring now to the drawings, wherein like reference numbers refer to like features throughout the several views, FIG. 1 illustrates a system 100 for vehicle Bluetooth pairing. The system 100 is illustrated including a vehicle 120. The vehicle 120 is illustrated including a cellular wireless communications module 122. The vehicle is further illustrated including a computerized pairing operation controller 130. The computerized pairing operation controller 130 is illustrated in electronic communication with a Bluetooth communications module 132 and with a touchscreen input/output device 134. The computerized pairing operation controller 130 may additionally include internal electronics for monitoring a global positioning service (GPS) location.

The system 100 is further illustrated including a smartphone device 110 which includes an input/output screen 112. The smartphone device 110 includes internal electronics configured to communicate wirelessly over a cellular communications network and through Bluetooth communications.

The system 100 is further illustrated including a cellular tower 142 configured for wireless cellular communications with the vehicle 120 and with the smartphone 110. A remote server device 140 is illustrated in electronic communication with the cellular tower 142 and is configured for communication and data transfer with and between the vehicle 120 and the smartphone 110.

The smartphone 110 and the electronics of the vehicle 120 are each configured for Bluetooth communication, and each may broadcast a notification signal or a beacon detectable by other nearby electronic devices configured for Bluetooth communication. The smartphone 110 and the electronics of the vehicle 120 are each configured for determining a location of the respective device. The location may be determinable by GPS signal, cellular tower signal triangulation, or other similar methods.

The computerized pairing operation controller 130 may include a vehicle onboarding application or a computerized program configured for operating the system and method disclosed herein. The computerized pairing operation controller 130 may include a Bluetooth application programming interface (API) which may provide functionality to enable a server-client relationship between the vehicle 120 as the server and the smartphone 110 as the client.

The smartphone 110 may include a smartphone onboarding application or a computerized program configured for operating the system and method disclosed herein. The smartphone 110 may include programming enabling the smartphone 110 to act as the client through the Bluetooth (API) established within the computerized pairing operation controller 130. The smartphone 110 may, as part of setting up the smartphone onboarding application upon the smartphone 110, include data configured as an authentication certificate useful to establish or confirm an identity of the smartphone 110 as a valid, trusted device with which to be communicated. The computerized pairing operation controller 130 may include data configured as a validation certificate useful to confirm the identity of the smartphone 110 based upon the smartphone 110 communicating data based upon its authentication certificate.

In one embodiment, a pairing operation between the vehicle 120 and the smartphone 110 may include three steps. A first step may include the vehicle providing a notification signal or a beacon which notifies the smartphone 110 of proximity of the vehicle 120 to the smartphone 110. A second step may include the smartphone onboarding application executed by the smartphone 110 establishing a secure Bluetooth low energy (BLE) connection between the smartphone 110 and the computerized pairing operation controller 130 of the vehicle 120. A third step may include setting up a classic Bluetooth connection between the smartphone 110 and the vehicle 120 via automation. Throughout the disclosure, a classic Bluetooth connection may be described as Bluetooth Basic Rate/Enhanced Data Rate (BR/EDR). The operations performed by each of the smartphone 110 and the vehicle 120 may be reversed in alternative embodiments.

The remote server device 140 may provide the vehicle onboarding application and the smartphone onboarding application for download. The remote server device 140 may facilitate communication between the smartphone 110 and the vehicle 120, for example, providing location data from one device to the other device.

Figure 2:
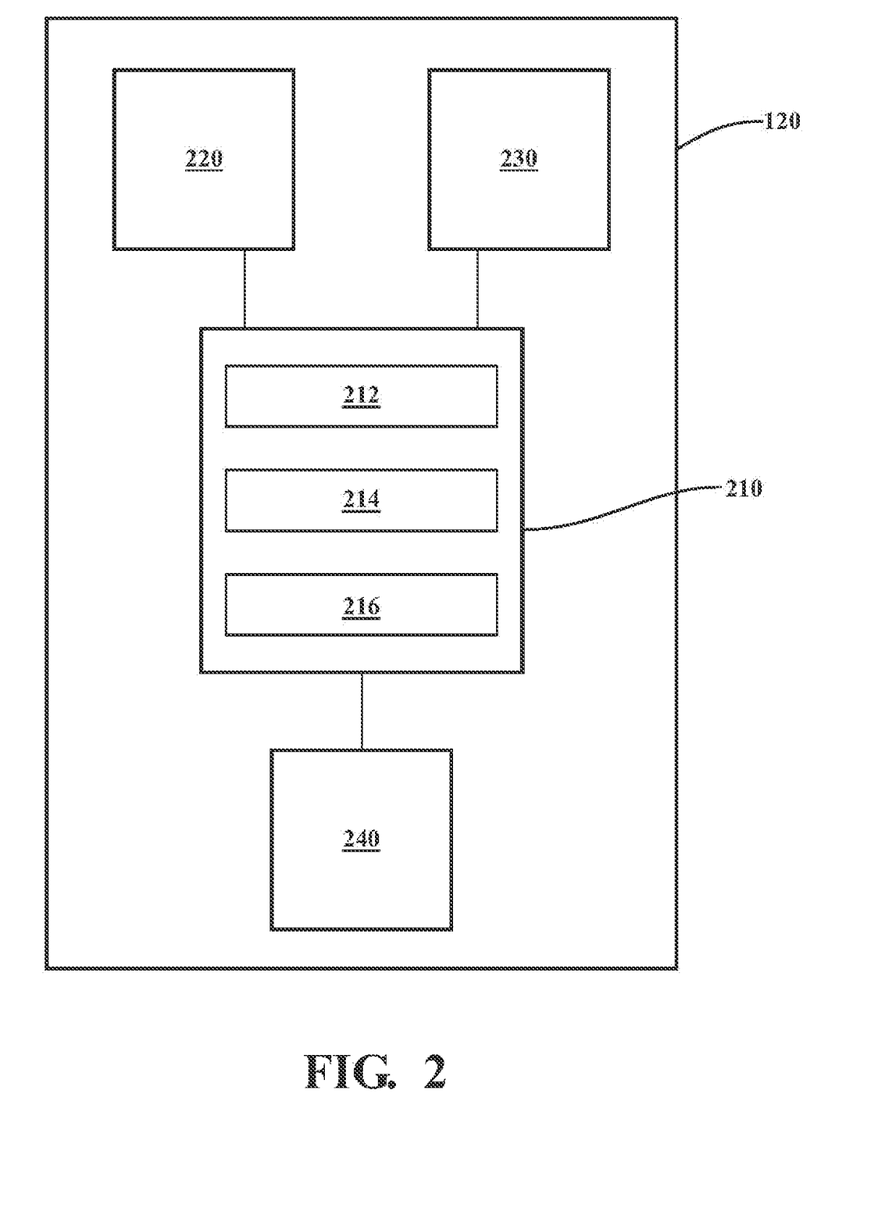
FIG. 2 schematically illustrates the smartphone of FIG. 1, in accordance with the present disclosure.

FIG. 2 schematically illustrates the smartphone 110 of FIG. 1. The smartphone 110 includes a computerized processing device 210, a communications device 220, an input/output coordination device 230, and a memory storage device 240. It is noted that the smartphone 110 may include other components and some of the components are not present in some embodiments.

The processing device 210 may include memory, e.g., read-only memory (ROM) and random-access memory (RAM), storing processor-executable instructions and one or more processors that execute the processor-executable instructions. In embodiments where the processing device 210 includes two or more processors, the processors may operate in a parallel or distributed manner. The processing device 210 may execute the operating system of the smartphone 110. Processing device 210 may include one or more modules executing programmed code or computerized processes or methods including executable steps. Illustrated modules may include a single physical device or functionality spanning multiple physical devices. The processing device 210 may further include programming modules, including a phone operation module 212, a smartphone onboarding module 214, and a Bluetooth programming module 216.

The communications device 220 may include a communications/data connection with a bus device configured to transfer data to different components of the system and may include one or more wireless transceivers for performing wireless communication.

The input/output coordination device 230 includes hardware and/or software configured to enable the processing device 210 to receive and/or exchange data with on-board resources of the smartphone 110, including the input/output screen 112 of FIG. 1, a microphone, a speaker, and buttons installed to the smartphone 110.

The memory storage device 240 is a device that stores data generated or received by the smartphone 110. The memory storage device 240 may include, but is not limited to, flash or solid-state memory.

The smartphone operation module 212 includes programming to enable smartphone 110 to operate, may include an operating system for the smartphone 110, and may include installed applications providing configurable functionality of the smartphone 110.

The smartphone onboarding application module 214 includes programming to operate the disclosed system and method. The smartphone onboarding application module 214 may include programming to determine proximity of the vehicle 120 of FIG. 1 to the smartphone 110. The smartphone onboarding application module 214 may include programming to utilize the authentication certificate to establish a trusted identity with the vehicle 120. The smartphone onboarding application module 214 may include programming to establish a BLE connection with the vehicle 120 and to establish a classic Bluetooth connection with the vehicle 120.

The Bluetooth programming module 216 includes programming to enable communication through the established Bluetooth connection with the vehicle 120.

The smartphone 110 is provided as an exemplary computerized device capable of executing programmed code to operate the disclosed system and method. A number of different embodiments of the smartphone 110 and modules operable therein are envisioned, and the disclosure is not intended to be limited to examples provided herein.

Figure 3:
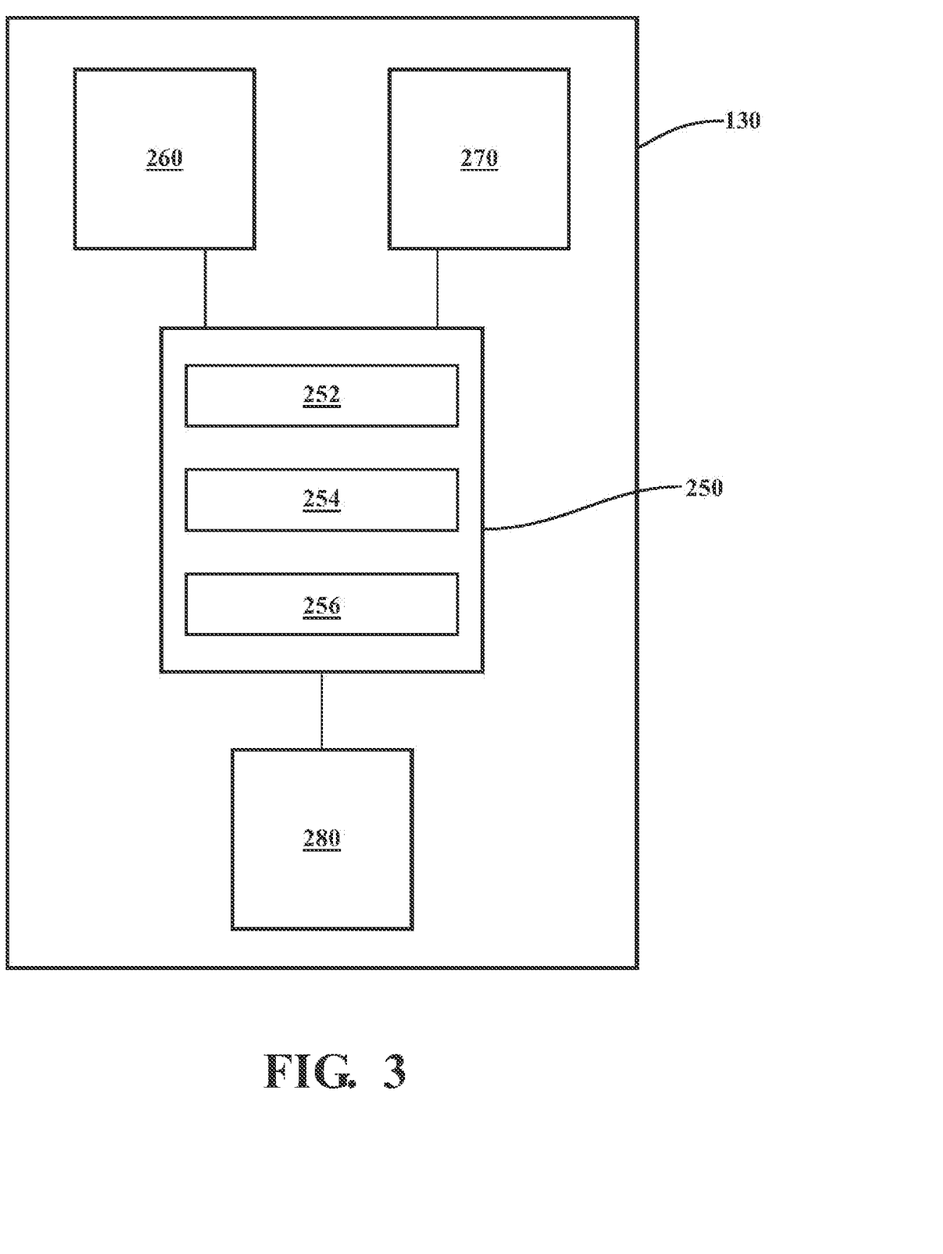
FIG. 3 schematically illustrates the computerized pairing operation controller of FIG. 1, in accordance with the present disclosure.

FIG. 3 schematically illustrates the computerized pairing operation controller 130 of FIG. 1. The computerized pairing operation controller 130 includes a computerized processing device 250, a communications device 260, an input/output coordination device 270, and a memory storage device 280. It is noted that the computerized pairing operation controller 130 may include other components and some of the components are not present in some embodiments.

The processing device 250 may include memory, e.g., read-only memory (ROM) and random-access memory (RAM), storing processor-executable instructions and one or more processors that execute the processor-executable instructions. In embodiments where the processing device 250 includes two or more processors, the processors may operate in a parallel or distributed manner. The processing device 250 may execute the operating system of the computerized pairing operation controller 130. Processing device 250 may include one or more modules executing programmed code or computerized processes or methods including executable steps. Illustrated modules may include a single physical device or functionality spanning multiple physical devices. The processing device 250 may further include programming modules, including a trusted device identity module 252, a vehicle onboarding module 254, and a Bluetooth API management module 256.

The communications device 260 may include a communications/data connection with a bus device configured to transfer data to different components of the system and may include one or more wireless transceivers for performing wireless communication.

The input/output coordination device 270 includes hardware and/or software configured to enable the processing device 250 to receive and/or exchange data with on-board resources of the vehicle 120, including the touchscreen input/output device 134 of FIG. 1, a microphone, a speaker, and buttons or other control inputs installed to the vehicle 120.

The memory storage device 280 is a device that stores data generated or received by the computerized pairing operation controller 130. The memory storage device 280 may include, but is not limited to, a hard-drive or flash or solid-state memory.

The trusted device identity module 252 includes programming to establish that a device to be paired with the vehicle 120 is a trusted device. The trusted device identity module 252 may include programming to utilize the validation certificate(s) to authenticate communications from the smartphone 110 of FIG. 1. The trusted device identity module 252 may include stored lists of trusted devices.

The vehicle onboarding module 254 includes programming to operate the disclosed system and method. The vehicle onboarding module 254 may include programming to initiate or control activation or operation of the notification signal useful to establish proximity of the vehicle 120 to the smartphone 110. The vehicle onboarding module 254 may include programming automate establishing the classic Bluetooth connection with the smartphone 110.

The Bluetooth API management module 256 includes programming to enable communication through the established Bluetooth connection with the smartphone 110 and provide for a client-server relationship between the smartphone 110 and the vehicle 120.

The computerized pairing operation controller 130 is provided as an exemplary computerized device capable of executing programmed code to operate the disclosed system and method. A number of different embodiments of the computerized pairing operation controller 130 and modules operable therein are envisioned, and the disclosure is not intended to be limited to examples provided herein.

Figure 4:
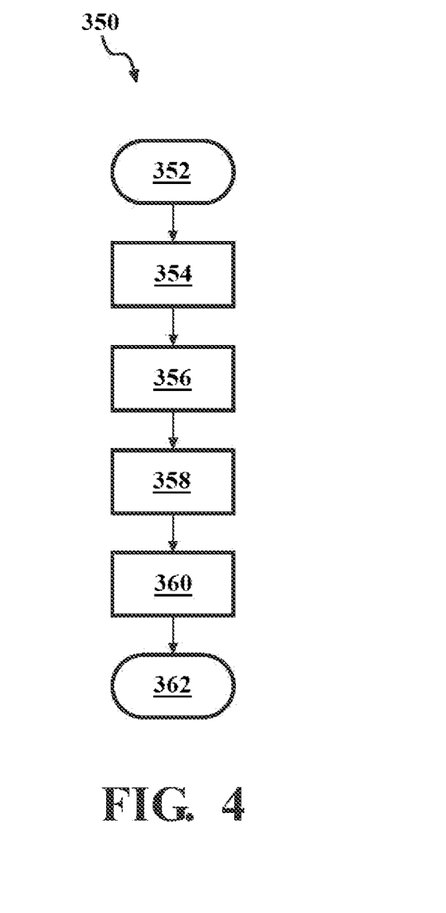
FIG. 4 is a flowchart illustrating a method for vehicle Bluetooth pairing, in accordance with the present disclosure.

FIG. 4 is a flowchart illustrating a method 350 for vehicle Bluetooth pairing. The method 350 starts at step 352. At step 354, a vehicle onboarding application is installed to the vehicle 120 of FIG. 1, and a smartphone onboarding application is installed to the smartphone 110 of FIG. 1. Additionally, an authentication certificate may be provided to the smartphone 110, and a validation certificate may be provided to the vehicle 120. At step 356, the vehicle 120 emits a notification signal, and the smartphone 110 monitors the notification signal. The smartphone 110 establishes proximity of the vehicle 120 to the smartphone 110 based upon the monitored notification signal. At step 358, the vehicle 120 utilizes an automated pairing process to establish a classic Bluetooth connection with the smartphone 110. At step 360, the smartphone 110 and the vehicle 120 are connected through a Bluetooth connection and may transfer data securely therebetween. At step 362, the method 350 ends. The method 350 is exemplary. A number of additional and/or alternative method steps are envisioned, and the disclosure is not intended to be limited to the examples provided.

Figure 5:
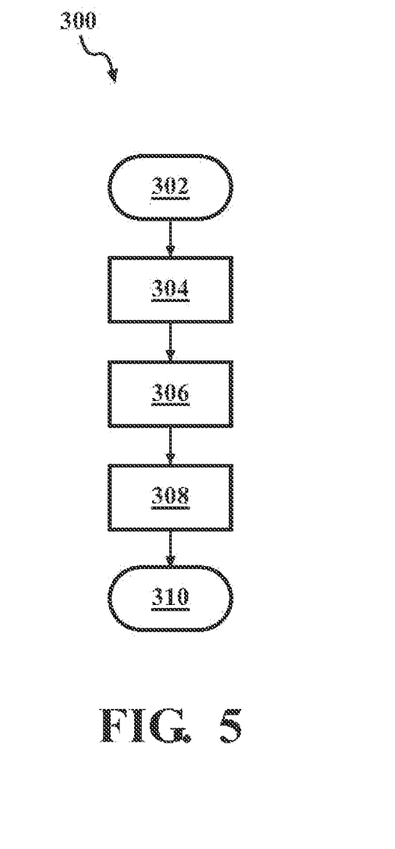
FIG. 5 is a flowchart illustrating a method for initiating a vehicle Bluetooth pairing operation, in accordance with the present disclosure.

FIG. 5 is a flowchart illustrating a method 300 for initiating a vehicle Bluetooth pairing operation. The method 300 starts at step 302. At step 304, a notification signal or beacon is utilized to establish proximity of the vehicle 120 of FIG. 1 to the smartphone 110 of FIG. 1. At step 306, once proximity is established, the smartphone 110 is established as a trusted device through use of an authentication certificate in the smartphone 110 and through use of a validation certificate in the vehicle 120. At step 308, with proximity and with the smartphone 110 established as a trusted device, the pairing operation may be initiated. At step 310, the method 300 ends. The method 300 is exemplary. A number of additional and/or alternative method steps are envisioned, and the disclosure is not intended to be limited to the examples provided.

Figure 6:
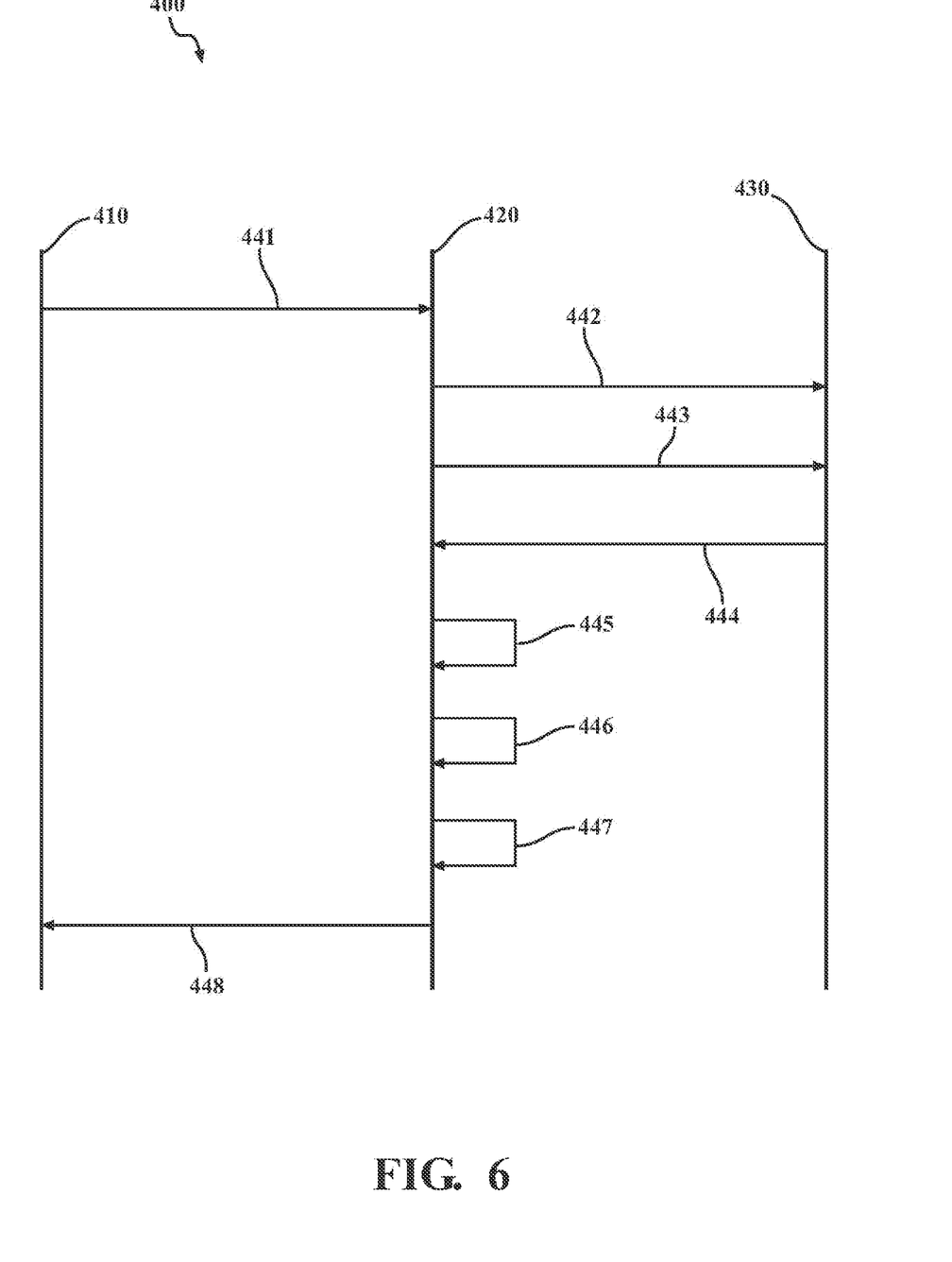
FIG. 6 is a dataflow illustrating communication between a user, an onboarding application, and a remote computer resource for a purpose of establishing simplified Bluetooth pairing, in accordance with the present disclosure.

FIG. 6 is a dataflow 400 illustrating communication between a user 410, an onboarding application 420, and a remote computer resource 430 for a purpose of establishing simplified Bluetooth pairing. The user 410 represents the actions of a customer/user input to and output to the customer/user from an exemplary input/output device such as the input/output screen 112 of FIG. 1 and/or the touchscreen input/output device 134 of FIG. 1. The onboarding application 420 represents computerized operations controlled by and information provided to the smartphone onboarding application of the smartphone 110 of FIG. 1 and/or the vehicle onboarding application of the vehicle 120 of FIG. 1. The remote computer resource 430 represents computerized operations controlled by and information provided to the remote server device 140 of FIG. 1. In operation 441, the user 410 initiates or enables simplified vehicle Bluetooth pairing. In operation 442, the onboarding operation provides information to the remote computer resource 430 to authenticate an identity of the user 410. In operation 443, the onboarding application 420 requests a vehicle identification number (VIN) for the vehicle 120 from the remote computer resource 430. In operation 444, the remote computer resource 430 provides the VIN to the onboarding application 420. In operation 445, the onboarding application 420 derives a beacon identifier. The beacon identifier may, in one embodiment, be described as a first function times the VIN. In operation 446, the onboarding application 420 derives a BLE universally unique identifier (UUID), which may be described as a second function times the VIN. Exemplary Bluetooth identifier derivation functions include secure hash algorithm 128 (SHA-128), message-digest algorithm 5 (MD5), message-digest algorithm 4 (MD4), message-digest algorithm 2 (MD2), or other similar algorithms. In operation 447, the onboarding application 420 registers the beacon identification. In operation 448, the onboarding application 420 certifies to the user 410 that simplified vehicle Bluetooth pairing is enabled. The dataflow 400 is provided as an example. A number of additional and/or alternative operations are envisioned, and the disclosure is not intended to be limited to the examples provided.

Figure 7:
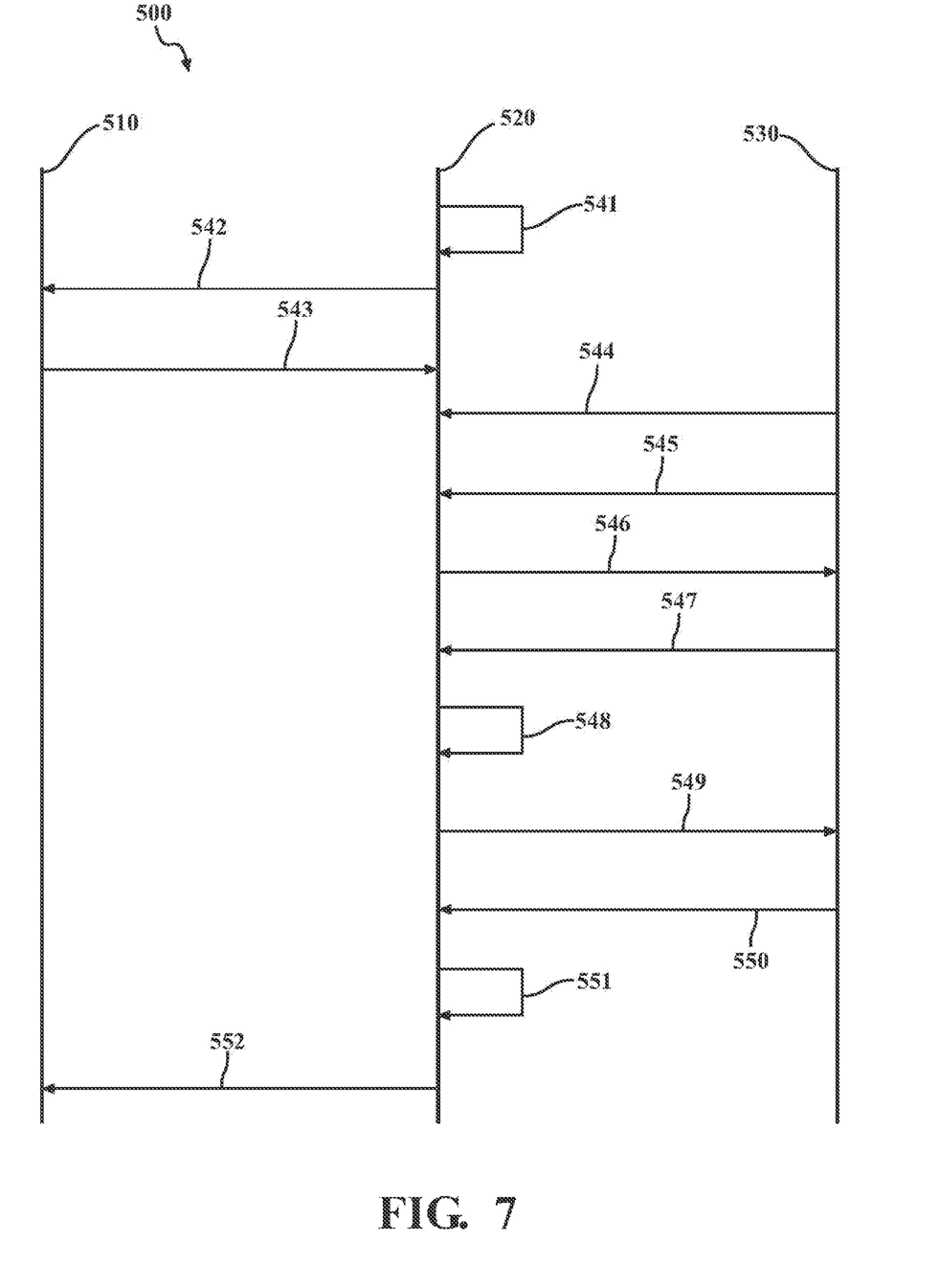
FIG. 7 is a dataflow illustrating communication between a user, a smartphone onboarding application, and a vehicle for Bluetooth pairing process, in accordance with the present disclosure.

FIG. 7 is a dataflow 500 illustrating communication between a user 510, a smartphone onboarding application 520, and a vehicle 530 for Bluetooth pairing process. The user 510 represents the actions of a customer/user input to and output to the customer/user from an exemplary input/output device such as the input/output screen 112 of FIG. 1 and/or the touchscreen input/output device 134 of FIG. 1. The smartphone onboarding application 520 represents computerized operations controlled by and information provided to the smartphone onboarding application of the smartphone 110 of FIG. 1. The vehicle 530 represents computerized operations controlled by and information provided to the vehicle 120 and/or the computerized pairing operation controller 130 of FIG. 1. In operation 541, the notification signal or beacon is found by the smartphone onboarding application 520. In operation 542, the smartphone onboarding application 520 prompts the user 510 to start the pairing process by providing an input. In operation 543, the user 510 provides an input to start the pairing process. In operation 544, the vehicle 120 establishes a secure BLE connection with the smartphone 110. In operation 545, identity verification is performed through use of the authentication certificate and the verification certificate. In operation 546, the smartphone onboarding application 520 requests from the vehicle 530 a Bluetooth name. In operation 547, the vehicle 530 provides to the smartphone onboarding application 520 the Bluetooth name. The Bluetooth name and other information transmitted between the entities will be signed with a certificate in order to establish and keep secure messaging between the entities. In operation 548, the smartphone onboarding application 520 initiates an automated pairing process. In operation 549, the smartphone onboarding application 520 requests a pairing code. In operation 550, the vehicle 530 responds with a pairing code. In operation 551, the smartphone onboarding application 520 confirms the pairing code, for example, by providing a prompt to a user of the smartphone 110 to confirm that the pairing code is correctly displayed upon both the smartphone 110 and a display of the vehicle 120. In operation 552, the smartphone onboarding application 520 provides a pairing complete confirmation to the user 510. The dataflow 500 is provided as an example. A number of additional and/or alternative operations are envisioned, and the disclosure is not intended to be limited to the examples provided.

Figure 8:
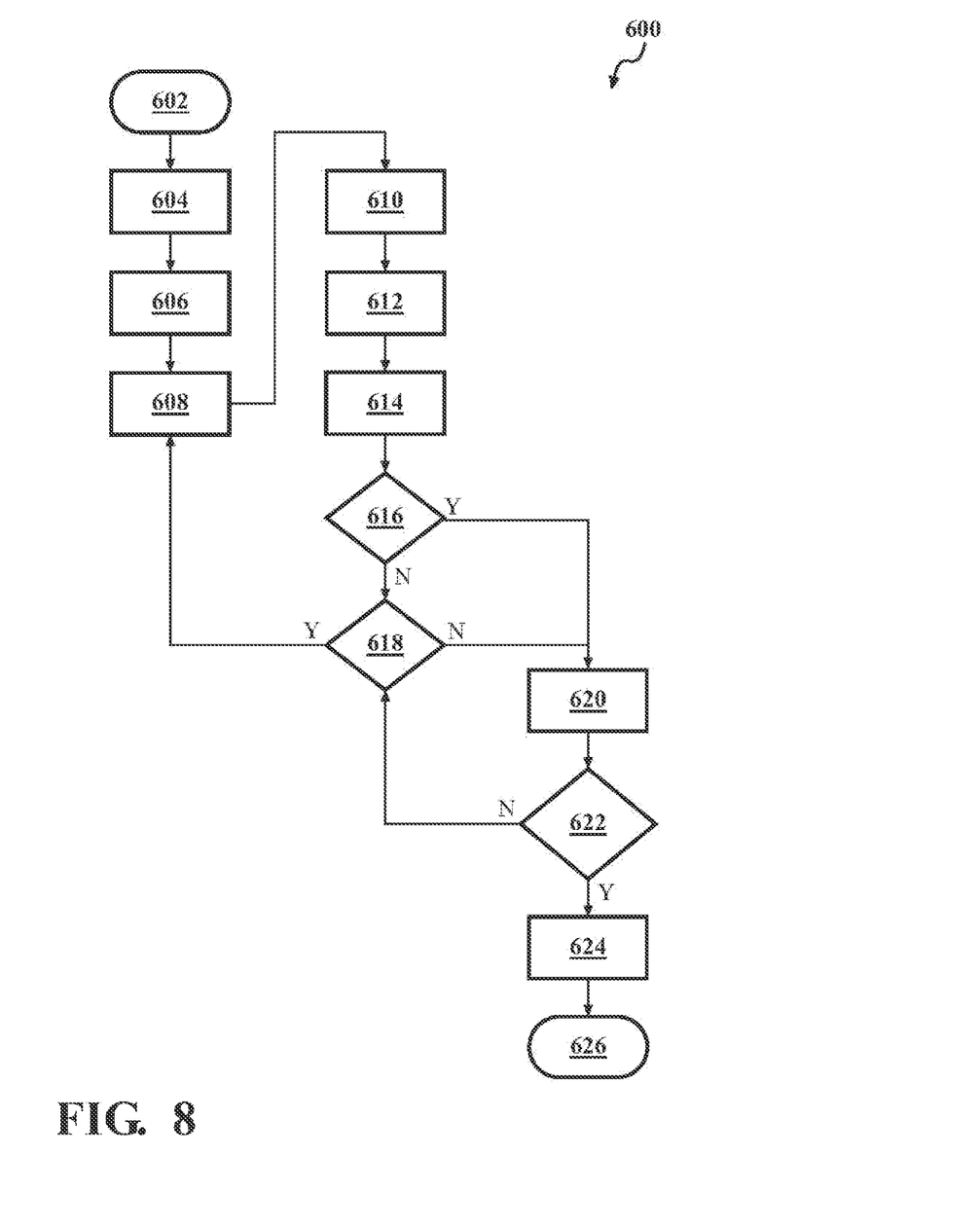
FIG. 8 is a flowchart illustrating method for operating a simplified vehicle Bluetooth pairing algorithm, in accordance with the present disclosure.

FIG. 8 is a flowchart illustrating method 600 for operating a simplified vehicle Bluetooth pairing algorithm. The method 600 starts at step 602. At step 604, a vehicle VIN for the vehicle 120 of FIG. 1 is retrieved. At step 606, Bluetooth identifiers are derived. At step 608, the smartphone 110 of FIG. 1 registers for vehicle beacon scanning. At step 610, vehicle beacon proximity callback is performed. At step 612, BLE is established and secured between the smartphone 110 and the vehicle 120. At step 614, the vehicle identity is confirmed. At step 616, a determination is made whether the vehicle identity is verified. If the vehicle identity is verified, the method 600 advances to the step 620. If the vehicle identity is not verified, the method 600 advances to the step 618. At step 618, a determination is made whether the customer has exited the range defined for proximity. If the customer has not exited the range defined for proximity, the method 600 advances to the step 620. If the customer has exited the range defined for proximity, the method returns to the step 608.

At step 620, a classic Bluetooth pairing process is initiated between the smartphone 110 and the vehicle 120. At step 622, a determination is made whether the pairing code is verified. If the pairing code is not verified, the method 600 returns to the step 618. If the pairing code is verified, the method 600 advances to the step 624, where a user is notified of pairing success. The method 600 ends at the step 626. The method 600 is exemplary. A number of additional and/or alternative method steps are envisioned, and the disclosure is not intended to be limited to the examples provided herein.

Figure 9:
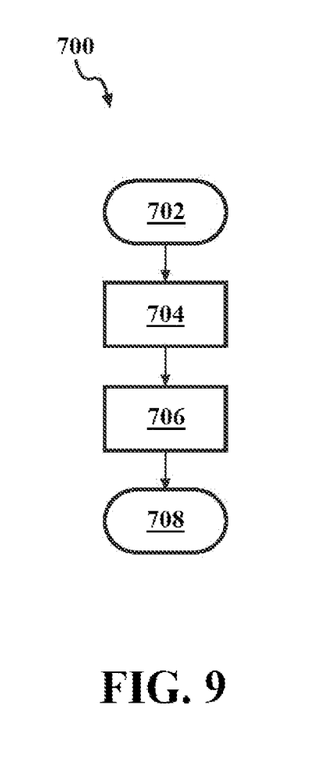
FIG. 9 is a flowchart illustrating a method for a customer to pair a Bluetooth enabled device with a vehicle including Bluetooth communications, in accordance with the present disclosure.

FIG. 9 is a flowchart illustrating a method 700 for a customer to pair a Bluetooth enabled device with a vehicle including Bluetooth communications. The method 700 starts at step 702. According to the disclosed system and method, the Bluetooth enabled device automatically determines proximity of the vehicle to the device. The device and the vehicle automatically authenticate each other. The device requests and the vehicle provides a Bluetooth name. The device requests a pairing code from the vehicle, and the vehicle provides the pairing code to the device. The aforementioned processes occur automatically and include no steps to be taken by the customer. At step 704, the device presents the pairing code to the customer and requests that the customer confirm that the pairing code provided on the device matches a pairing code displayed upon a screen installed to the vehicle. At step 706, the customer provides a single touch input to the Bluetooth enabled device confirming that the pairing code displayed upon the device matches the pairing code displayed by the vehicle. Upon the customer providing the single touch input to the screen, the pairing is completed. The method 700 ends at step 708. The method 700 is exemplary and may vary depending upon the brand of the Bluetooth enabled device and communication protocols programmed there into. A number of additional and/or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for vehicle Bluetooth pairing, the system comprising:
  a smartphone configured for Bluetooth communication, wherein the smartphone includes an authentication certificate;
  a vehicle including:
    a computerized pairing operation controller configured for Bluetooth communication, the computerized pairing operation controller including a verification certificate, the computerized pairing operation controller including programming to:
      emit a notification signal detectable by the smartphone, wherein the notification signal includes the verification certificate; and
      receive the authentication certificate from the smartphone;

wherein the smartphone includes programming to:
  establish proximity to the vehicle based upon the notification signal;
  verify identity of the vehicle based upon the authentication certificate and the verification certificate; and
  establish a Bluetooth low energy (BLE) connection to the vehicle based upon establishing the proximity; and
wherein the computerizing pairing operation controller further includes programming to automatically set up a Bluetooth connection after the Bluetooth low energy connection is established; and
wherein the smartphone further includes programming to re-establish proximity to the vehicle when the smartphone has exited a range for establishing the proximity to the vehicle.

2. The system of claim 1, wherein the smartphone further includes programming to utilize the authentication certificate to provide an identity to the vehicle; and
wherein the programming to automatically set up the Bluetooth connection is performed after the identity is verified.

3. The system of claim 1, wherein the notification signal includes data configured as an identifier specific to the vehicle; and
wherein the programming to establish proximity to the vehicle based upon the notification signal establishes proximity to the vehicle based upon the data configured as the identifier specific to the vehicle.

4. The system of claim 3, wherein the data configured as an identifier specific to the vehicle is based upon a vehicle identification number for the vehicle.

5. The system of claim 1, wherein the programming to automatically set up the Bluetooth connection includes:
  the smartphone and the vehicle verifying identities of each other based upon the authentication certificate saved in the smartphone and the verification certificate saved in the vehicle;
  the smartphone requesting a Bluetooth name from the vehicle;
  the vehicle providing the Bluetooth name to the smartphone;
  the smartphone requesting a pairing code from the vehicle; and
  the vehicle providing the pairing code to the smartphone.

6. The system of claim 5, wherein the programming to automatically set up the Bluetooth connection further includes:
  the pairing code being displayed upon a display of the vehicle;
  the pairing code being displayed upon the smartphone; and
  completing the Bluetooth connection based upon a user providing confirmation of matching pairing codes.

7. The system of claim 1, wherein the programming to establish the Bluetooth low energy connection to the vehicle includes deriving a Bluetooth low energy service identifier based upon a vehicle identification number for the vehicle.

8. The system of claim 1, wherein the programming to automatically set up the Bluetooth connection includes:
  monitoring a single touch input by a user to the smartphone; and
  completing the Bluetooth connection based upon the single touch input.

9. A system for vehicle Bluetooth pairing, the system comprising:
  a smartphone configured for Bluetooth communication, wherein the smartphone includes an authentication certificate;
  a vehicle including:
    a computerized pairing operation controller configured for Bluetooth communication, the computerized pairing operation controller including a verification certificate, the computerized pairing operation controller including a vehicle onboarding application including programming to:
      emit a notification signal detectable by the smartphone, wherein the notification signal includes the verification certificate; and
      receive the authentication certificate from the smartphone;
  wherein the smartphone includes a smartphone onboarding application including programming to:
    establish proximity to the vehicle based upon the notification signal;
    verify identity of the vehicle based upon the authentication certificate and the verification certificate; and
    establish a Bluetooth low energy connection to the vehicle based upon establishing the proximity; and
  wherein the vehicle onboarding application further includes programming to automatically set up a Bluetooth connection after the Bluetooth low energy connection is established; and
  wherein the smartphone further includes programming to re-establish proximity to the vehicle when the smartphone has exited a range for establishing the proximity to the vehicle.

10. The system of claim 9, wherein the programming to automatically set up the Bluetooth connection includes:
  the smartphone and the vehicle verifying identities of each other based upon the authentication certificate saved in the smartphone and the verification certificate saved in the vehicle;
  the smartphone requesting a Bluetooth name from the vehicle;
  the vehicle providing the Bluetooth name to the smartphone;
  the smartphone requesting a pairing code from the vehicle; and
  the vehicle providing the pairing code to the smartphone.

11. The system of claim 9, wherein the vehicle onboarding application and the smartphone onboarding application are configured for completing the Bluetooth connection based upon a single touch input by a user to the smartphone.

12. A method for vehicle Bluetooth pairing, the method comprising:
  within a first computerized processor of a vehicle,
    activating Bluetooth signal including a notification signal visible to Bluetooth enabled devices, wherein the notification signal includes a verification certificate;
  within a second computerized processor of a smartphone, wherein the smartphone includes an authentication certificate,
    receiving the notification signal;
    establishing proximity to the vehicle based upon the notification signal;
    verifying identity of the vehicle based upon the authentication certificate and the verification certificate; and establishing a Bluetooth low energy connection to the vehicle based upon establishing the proximity; and within the first computerized processor, automatically setting up a Bluetooth connection after the Bluetooth low energy connection is established; and re-establishing proximity to the vehicle when the smartphone has exited a range for establishing the proximity to the vehicle.

13. The method of claim 12, further comprising:

within the second computerized processor, utilizing the authentication certificate to provide an identity to the vehicle; and within the first computerized processor, utilizing the verification certificate to verify the identity of the smartphone; and wherein automatically setting up the Bluetooth connection is performed after the identity is verified.

14. The method of claim 12, wherein the notification signal includes data configured as an identifier specific to the vehicle; and wherein establishing proximity to the vehicle based upon the notification signal includes establishing the proximity to the vehicle based upon the data configured as the identifier specific to the vehicle.

15. The method of claim 14, wherein the data configured as an identifier specific to the vehicle is based upon a vehicle identification number for the vehicle.

16. The method of claim 12, wherein automatically setting up the Bluetooth connection includes:

verifying identities of the smartphone and the vehicle based upon the authentication certificate saved in the smartphone and the verification certificate saved in the vehicle;

the smartphone requesting a Bluetooth name from the vehicle;

the vehicle providing the Bluetooth name to the smartphone;

the smartphone requesting a pairing code from the vehicle; and the vehicle providing the pairing code to the smartphone.

17. The method of claim 16, wherein automatically setting up the Bluetooth connection further includes:

the pairing code being displayed upon a display of the vehicle;

the pairing code being displayed upon the smartphone;

the smartphone prompting a user to provide confirmation of matching pairing codes; and completing the Bluetooth connection based upon the confirmation.

18. The method of claim 12, wherein establishing the Bluetooth low energy connection to the vehicle includes deriving a Bluetooth low energy service identifier based upon a vehicle identification number for the vehicle.

19. The method of claim 12, wherein automatically setting up the Bluetooth connection includes:

monitoring a single touch input by a user to the smartphone; and completing the Bluetooth connection based upon the single touch input.

* * * * *